US008644367B2

(12) United States Patent
Nagaishi et al.

(10) Patent No.: US 8,644,367 B2
(45) Date of Patent: Feb. 4, 2014

(54) ANTENNA BEAM SCAN UNIT AND WIRELESS COMMUNICATION SYSTEM USING ANTENNA BEAM SCAN UNIT

(75) Inventors: Hideyuki Nagaishi, Hachioji (JP); Nobuhiko Shibagaki, Kokubunji (JP); Yuichi Shimayama, Shimotsuke (JP)

(73) Assignee: Hitachi Chemical Co., Ltd, Tokyo (JP)

( * ) Notice: Subject to any disclaimer, the term of this patent is extended or adjusted under 35 U.S.C. 154(b) by 34 days.

(21) Appl. No.: 13/438,957

(22) Filed: Apr. 4, 2012

(65) Prior Publication Data

US 2012/0257653 A1 Oct. 11, 2012

(30) Foreign Application Priority Data

Apr. 6, 2011 (JP) ................................ 2011-084838

(51) Int. Cl.
*H04B 1/38* (2006.01)

(52) U.S. Cl.
USPC ........... 375/219; 375/130; 375/141; 375/146; 375/147; 375/267; 375/295; 375/299; 375/316; 375/347; 455/101; 455/132; 455/500; 455/562.1; 370/334; 370/464; 341/173; 342/374

(58) Field of Classification Search
USPC ......... 375/130, 141, 146, 147, 219, 267, 295, 375/299, 316, 347; 455/101, 132, 500, 455/562.1; 370/334, 464; 341/173
See application file for complete search history.

(56) References Cited

U.S. PATENT DOCUMENTS

2010/0073260 A1 3/2010 Fujita

FOREIGN PATENT DOCUMENTS

JP 2003-152422 A 5/2003
JP 2005-354388 A 12/2005
JP 2010-74781 A 4/2010

*Primary Examiner* — Leon Flores
(74) *Attorney, Agent, or Firm* — Miles & Stockbridge P.C.

(57) ABSTRACT

An antenna beam scan unit includes: a Rotman lens that performs power division and synthesis between plural antenna ports and three or more beam ports; plural antenna elements which are connected to the respective antenna ports and to or from which radio waves are inputted or outputted; plural amplifiers that are connected to the respective beam ports of the Rotman lens and perform amplitude modulation on a signal; input paths for a transmission signal disposed in association with the amplifiers; switches for switching the input paths; and a beam control unit. The input paths include first paths and second paths on which a signal that is out of phase with a signal on the first paths is produced. The beam control unit selects two adjoining beam ports, and can switch the first paths and second paths as the input paths for the two beam ports.

15 Claims, 13 Drawing Sheets

ANTENNA BEAM SCAN UNIT AND WIRELESS COMMUNICATION SYSTEM USING ANTENNA BEAM SCAN UNIT

CLAIM OF PRIORITY

The present application claims priority from Japanese Patent Application JP 2011-084838 filed on Apr. 6, 2011, the content of which is hereby incorporated by reference into this application.

FIELD OF THE INVENTION

The present invention relates to an antenna beam scan unit and a wireless communication system using the antenna beam scan unit. More particularly, the present invention is concerned with an antenna unit that uses a Rotman lens to perform phase synthesis and division.

BACKGROUND OF THE INVENTION

In case an obstacle with high reflection intensity (a truck, a guardrail, a shutter, a refrigerator, or the like) is present in the vicinity of a target entity such as communication equipment, electromagnetic interference occurs due to multipath propagation. This degrades communication quality. A phased-array antenna is known as a technology for transmitting or receiving electromagnetic waves selectively in a specific direction by sweeping a narrow-angle beam. The phased-array antenna including plural antenna elements can sweep a beam by actively changing phase planes of electromagnetic waves coming from the respective antenna elements. As a method for achieving the active change, a variable phase shifter is provided for the respective antenna elements, and independently controlled in order to obtain a desired beam angle. As a method of realizing a phased-array antenna that does not use the variable phase shifters, the antenna elements are connected via a Rotman lens capable of performing division and synthesis on an electromagnetic wave.

A conventional phased-array antenna using a Rotman lens can, as described in Japanese Patent Application Laid-Open Publication No. 2003-152422, avoid multipath propagation, which is caused by an obstacle, by producing a narrow-angle antenna beam which is formed by numerous antenna elements, and transmitting or receiving an electromagnetic wave to or from communication equipment present in a desired direction.

Japanese Patent Application Laid-Open Publication No. 2010-074781 describes that a Rotman lens having two input ports is used to construct a phased-array antenna. When power is fed to the two input ports, respective variable amplifiers are used to control a power ratio. Thus, a beam can be controlled at infinite stepped angles within an intermediate range between beams inputted through the input ports.

As described in Japanese Patent Application Laid-Open Publication No. 2005-354388, an antenna having a null point is known as a means for narrowing a beam (realizing a high resolution) without an increase in the number of antenna elements constituting a phased-array antenna. In case a monopulse radar is formed using the antenna that has the null point, a delta (Δ)-pattern beam and a sigma (Σ)-pattern beam are needed. As for a monopulse method, when two antennas are disposed sideways, although a signal propagating along a bisector of the two antennas is received at the same phase because distances to the antennas are identical to each other, a signal propagating in any other area undergoes a phase difference because of distance difference. Therefore, sum and difference signals of powers received by the two antennas are produced, and an incoming angle is estimated based on an amplitude ratio between the signals. In particular, the difference signal exhibits an abrupt amplitude change at a point near the null point. Therefore, when a phased-array antenna beam is swept, if an extreme value of the ratio of the sum and difference signals is measured concurrently, a radar offering a high angular resolution can be realized.

SUMMARY OF THE INVENTION

In the phased-array antenna described in Japanese Patent Application Laid-Open Publication No. 2003-152422, when communication equipment that is a target is present in the middle of a peak angle of each beam produced by the Rotman lens, if an adder or a multiplier is used to perform phase and amplitude synthesis for adjacent input ports of the Rotman lens, offering an antenna gain in a desired direction and narrowing an antenna beam can be achieved. In the phased-array antenna using the Rotman lens, an intermediate beam can be easily produced by performing amplitude synthesis for the adjacent input ports of the Rotman lens. In the phased-array antenna using the Rotman lens, since the intermediate beam can be produced through power synthesis, the number of beams can be increased without an increase in the number of input ports of the Rotman lens. However, in case an obstacle approaches the target entity, the obstacle and target entity often exist within the range of one beam. Therefore, finer beam directivity is desired.

In contrast, according to the method described in Japanese Patent Application Laid-Open Publication No. 2010-074781, the direction of a beam can be arbitrarily controlled by employing the Rotman lens and variable amplifiers. However, only when the antenna elements constituting the phased-array antenna are constructed so that beams can intersect with their half-power points aligned with each other, a synthetic wave consistent with an antenna gain can be obtained. Powers applied through the input ports are divided and synthesized by the Rotman lens, and then radiated from any of the antenna elements. Therefore, the antenna directivity to be attained is an antenna directivity resulting from vector addition (spatial synthesis). Even if a degree of consistence in the antenna directivity among beams of the phased-array antenna gets lower than a degree attained at a point several decibels or more below a half-power point, an adverse effect on each antenna beam is limited (if the degree of consistence is lower than a degree attained at a point 10 dB below a peak value point, a power ratio is 0.1 or less). Therefore, the antenna directivity to be attained is an antenna directivity obtained by performing scalar addition of antenna beams. Eventually, a beam angle gets widened.

However, widening a beam angle invites degradation of communication quality in a space in which multipath propagation occurs frequently. Therefore, for designing a Rotman lens, the Rotman lens has to include three or more input ports which exhibit such an antenna directivity that brings about overlap of beams by a degree expressed as less than 10 dB. A multiplier that makes it possible to narrow the beam angle can be utilized as long as a received signal is subjected to numerical processing. However, since a transmission signal is subjected to spatial synthesis, electromagnetic waves reach an obstacle therefore no effect is exerted in suppression of multipath propagation.

In communications, when a wider-angle antenna is used, a scan time can be shortened. However, when multipath propagation occurs, a narrower-angle antenna has to be used for scanning. There is difficulty in realizing power division and synthesis for an antenna element in an antenna structure having a beamforming feature, and increasing or decreasing the number of effective antenna elements at the same time. In particular, when an obstacle exists near a target entity, a communication failure due to multipath propagation occurs because of waves reflected from the obstacle. The communication failure can be avoided by performing narrow-angle beamforming using a larger number of antenna elements. However, the configuration of a beamforming device gets more complex.

In the monopulse method described in Japanese Patent Application Laid-Open Publication No. 2005-354388, it is necessary to use a commutative optical phase distribution converter to produce local beams, which are 180° out of phase, for the purpose of forming a null point. This necessitates machining of a member in the size of a half or quarter of an optical wavelength. High precision in, for example, the positions of a beam synthesizer and a fiber array is required.

An object of the present invention is to address the foregoing problems, and to provide an antenna beam scan unit capable of offering an antenna gain in a desired direction and narrowing an antenna beam without an increase in the number of input beams in a phased-array antenna using a Rotman lens, and a wireless communication system using the antenna beam scan unit.

An antenna beam scan unit that is a present invention intended to accomplish the foregoing object includes: a Rotman lens that performs power division and synthesis between a plurality of antenna ports and three or more beam ports; a plurality of antenna elements which are connected to the respective antenna ports of the Rotman lens and to or from which radio waves are inputted or outputted; a plurality of amplifiers the number of which is identical to the number of the beam ports, which are connected to the respective beam ports of the Rotman lens, and which perform amplitude modulation on a signal; a plurality of input paths for a transmission signal disposed in association with the plurality of amplifiers; a plurality of switches for switching the input paths; and a beam control unit that controls the amplifiers and switches, wherein each of the input paths include a first path and a second path on which a signal that is out of phase with a signal on the first path is produced; and wherein the beam control unit selects two adjoining beam ports, and switches the first paths and second paths as the input paths for the two adjoining beam ports.

According to the present invention, there is provided an antenna beam scan unit capable of offering an antenna gain in a desired direction and narrowing an antenna beam angle without an increase in the number of input beams, and a wireless communication system using the antenna beam scan unit.

DETAILED DESCRIPTION OF THE EMBODIMENTS

Figure 1:
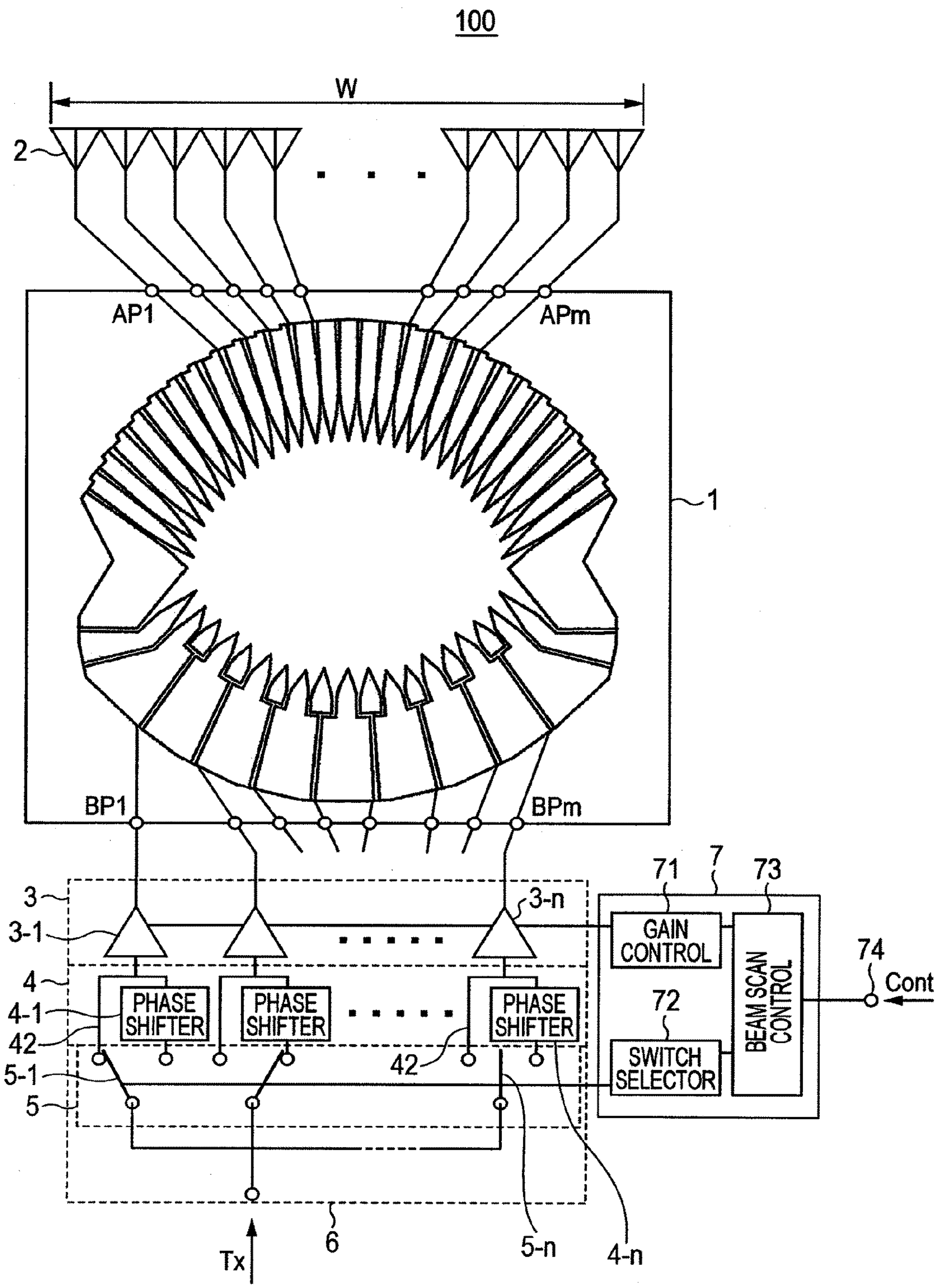
FIG. 1 is a configuration diagram of an antenna beam scan unit using a Rotman lens for transmitter in accordance with a first embodiment of the present invention.

According to a typical embodiment of the present invention, an antenna beam scan unit includes a phased-array antenna having a Rotman lens that performs power division and synthesis between plural input ports and plural output ports. Plural antenna elements to or from which radio waves are inputted or outputted are connected to one of antenna-port groups of the Rotman lens. An amplifier capable of performing amplitude modulation on a signal is connected to each of beam ports belonging to the other opposite beam-port group of the Rotman lens. The input terminal of the amplifier is connected to a switch capable of selectively linking two paths. On one of the paths, a signal does not undergo a phase difference. On the other path, a fixed phase shifter that produces a signal which is out of phase with the signal on the one of the paths is disposed. A divider is included for dividing power into portions that are fed to the same number of amplifiers as the number of beam ports through the switches. Further, a unit is included that sequentially selects two adjoining beam ports from among three or more beam ports of the Rotman lens in the antenna beam scan unit, concurrently and independently controls adjustment of amplitude gains of the amplifiers connected to the selected beam ports and phase adjustment through the switches, and controls the other amplifiers so that they enter a pinch-off state to attenuate signals.

By adopting the foregoing configuration, a beam of the phased array antenna in which power is divided and synthesized by the Rotman lens is formed with a synthetic wave of signals inputted through the adjoining beam ports. Two adjoining beam ports are sequentially selected. By adjusting the amplitude ratio for two selected amplifiers, an antenna beam angle can be scanned in a non-stepped manner. This makes it possible to offer an antenna gain in a desired direction and narrow the angle of an antenna beam without an increase in the number of input beams.

According to the typical embodiment of the present invention, a wireless communication system includes: a Rotman lens that performs power division and synthesis of an electromagnetic wave; variable amplifiers that perform amplitude modulation and are connected to respective input ports of the Rotman lens; fixed phase shifters that form a null point at the time of synthesizing signals so as to produce an antenna beam; switches that switch a non-phase modulated signal and a phase modulated signal as an input signal of each of the variable amplifiers; a divider that equally divides power into the same number of portions as the number of input ports of the Rotman lens, or a multi-output switch; antenna elements the number of which is identical to the number of output ports of the Rotman lens; a transceiver that modulates a transmission wave or received wave into digital information or demodulates the digital information; and a signal processing circuit that inspects the quality of a communication line on the basis of a communication signal sent from the transceiver.

According to the present invention, an amplitude ratio is controlled for two adjoining input ports out of the numerous input ports of the Rotman lens, beam sweep is carried out, and signal quality is inspected via the transceiver and signal processing circuit. Thus, presence or absence of a target entity and a degree of degradation of communication quality are determined. Further, when degradation of communication quality is significant due to an adverse effect of multipath propagation caused by an obstacle located near the target entity, if it is hard to establish a communication line, a signal is inputted to one of the two adjoining input ports of the Rotman lens via the phase shifter. Thus, the phased array antenna is allowed to exhibit such a beam directivity that the phased array antenna has a null point, and to sweep a beam. This proves effective in suppressing the power of a wave reflected from an obstacle, and in upgrading communication quality.

Referring to the drawings, embodiments of the present invention will be described below.

First Embodiment

A wireless communication system using a millimeter-wave antenna beam scan unit which is a first embodiment of the present invention will be described in conjunction with FIG. 1 to FIG. 8C.

To begin with, referring to FIG. 1, the configuration of a phased array antenna beam scan unit for transmitter 100 using a Rotman lens in accordance with the present embodiment will be described below. In FIG. 1, there are shown a Rotman lens 1, antenna elements 2, variable amplifiers 3 (3-1 to 3-*n*), and input blocks 4. The Rotman lens 1 includes plural input and output ports, that is, antenna ports (AP1 to APm) and beam ports (BP1 to BPn). The antenna elements 2 to or from which radio waves are inputted or outputted are connected to the antenna ports. The variable amplifiers 3 capable of performing amplitude modulation on a signal are connected to the respective ones of the other beam ports. That is, the number of variable amplifiers is identical to the number of beam ports (three or more). The input blocks 4 capable of selectively linking two paths are disposed at the respective input terminals of the amplifiers. The input block 4 serving as an input path of each variable amplifier 3 includes a first path on which no phase difference is given, and a second path on which a signal that is out of phase with the signal on the first path is produced. Specifically, the input block 4 includes a through path 42 (first path) intended to keep signals, which are inputted to adjoining beam ports, in phase with each other, and the second path including a fixed phase shifter 41 (4-1 to 4-*n*) intended to produce a null point when a beam is radiated from each of the antenna elements via the Rotman lens. Switches 5 (5-1 to 5-*n*) are two-output switches each of which changes the state of connection between the input block 4 and a divider 6 that performs power division. Each of the two-output switches 5 has one terminal thereof connected to the through path 42 on which no phase difference is given, and has the other terminal thereof connected to the path including the fixed phase shifter 41, which produces a signal that is out of phase with the signal that passes through the through path, for the purpose of selecting whether a signal to be inputted to the variable amplifier 3 should undergo a phase shift. A transmission signal Tx is inputted to the divider 6. A beam control unit 7 includes a gain control 71 that controls a gain of the variable amplifier 3, a switch control 72 that controls the switches, and a beam scan control 73 that controls the gain control 71 and switch control 72 on the basis of a beam scan control signal Cont. The switch control 72 has the capability to control a null point on the basis of the beam scan control signal Cont, and brings the switches 5 (5-1 to 5-*n*) to a "phase shifter off" state, in which the switch is connected to the through path 42, or a "phase shifter on" state in which the switch is connected to the fixed phase shifter 41. The phase of a signal on the second path onto which the fixed phase shifter 41 is connected is a reverse of the phase of a signal on the first path onto which the fixed phase shifter is not connected. Specifically, the present embodiment is characterized in that: as the pair of physically adjoining input paths of the Rotman lens, power feed paths (first and second paths) on which a phase is held intact or reversed are formed; and a radio wave is inputted to the Rotman lens over either of the paths for the purpose of providing an antenna beam with a null point. Production of a reverse-phases synthetic wave having the null point will be described later in conjunction with FIG. 8A to FIG. 8C.

The Rotman lens 1 in the present embodiment is an example having twelve antenna ports (AP1 to AP12) and eight beam ports (BP1 to BP8). The antenna elements are juxtaposed over a width W. The antenna elements 2 are connected to the respective antenna ports (AP1 to AP12) of the Rotman lens 1, and the output terminals of the variable amplifiers 3 capable of performing amplitude modulation are connected to the respective beam ports (BP1 to BP8). The divider 6 divides the power of the transmission signal Tx into the same number of portions as the number of beams of the antenna beam scan unit 100 (the number of beam ports that are the input ports of the Rotman lens), and feeds the portions to the input terminals of the switches 5.

Figure 2:
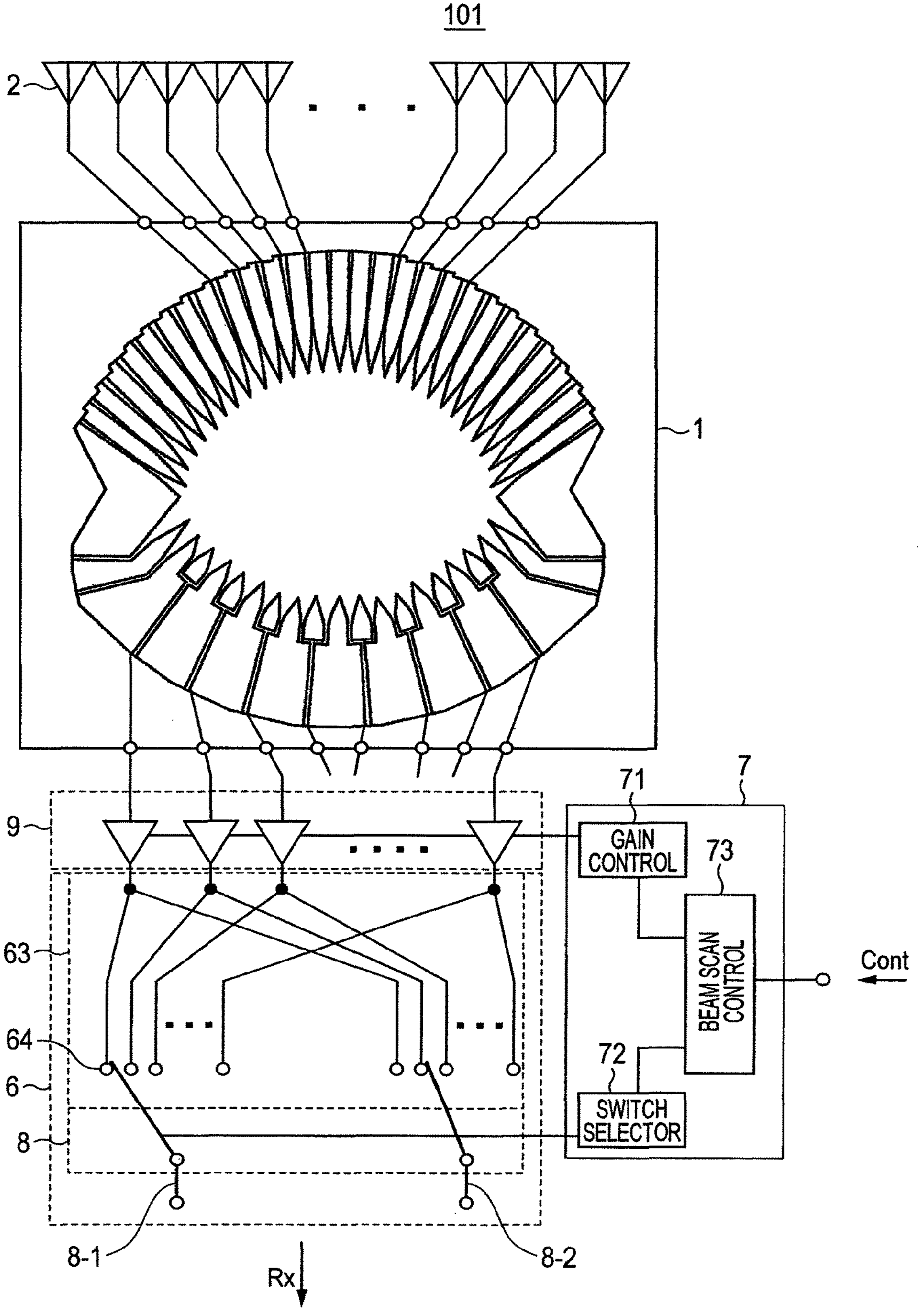
FIG. 2 is a configuration diagram showing power division in a multi-input Rotman lens that is a counterpart of the Rotman lens for transmission in FIG. 1 and is intended to be used for reception.

FIG. 2 shows an example of an antenna beam scan unit for receiver 101 in accordance with the first embodiment. There are shown a Rotman lens 1, antenna elements 2, a splitter 63, a beam control unit 7, multi-port switches 8 (8-1 and 8-2), and low-noise amplifiers 9. A received signal Rx is fed through the multi-port switch 8. The beam control unit 7 includes a gain control 71 that controls a gain of the low-noise amplifier 9, a switch control 72 that controls the switches 5 and multi-port switches 8, and a beam scan control 73 that controls the gain control 71 and switch control 72 on the basis of a beam scan control signal Cont.

The Rotman lens 1 shown in FIG. 2 is also an example having twelve antenna ports (AP1 to AP12) and eight beam ports (BP1 to BP8). The antenna elements 2 are connected to the respective antenna ports of the Rotman lens 1, and the input terminals of the low-noise amplifiers 9 are connected to the respective beam ports. The output terminals of the low-noise amplifiers 9 are connected to the respective input terminals of the splitter 63. The splitter 63 has two output terminals 64 in association with each of the input terminals. The left output terminals 64 and right output terminals 64 of the splitter are connected to the two multi-port switches 8-1 and 8-2 respectively.

The antenna beam scan unit 101 in FIG. 2 is intended for reception. After the received signal Rx is demodulated via a transceiver, the signal can be analyzed by a signal processing circuit. Therefore, the antenna beam scan unit 101 merely has the capability to output received signals that are applied through any two beam ports of the Rotman lens 1.

Figure 3:
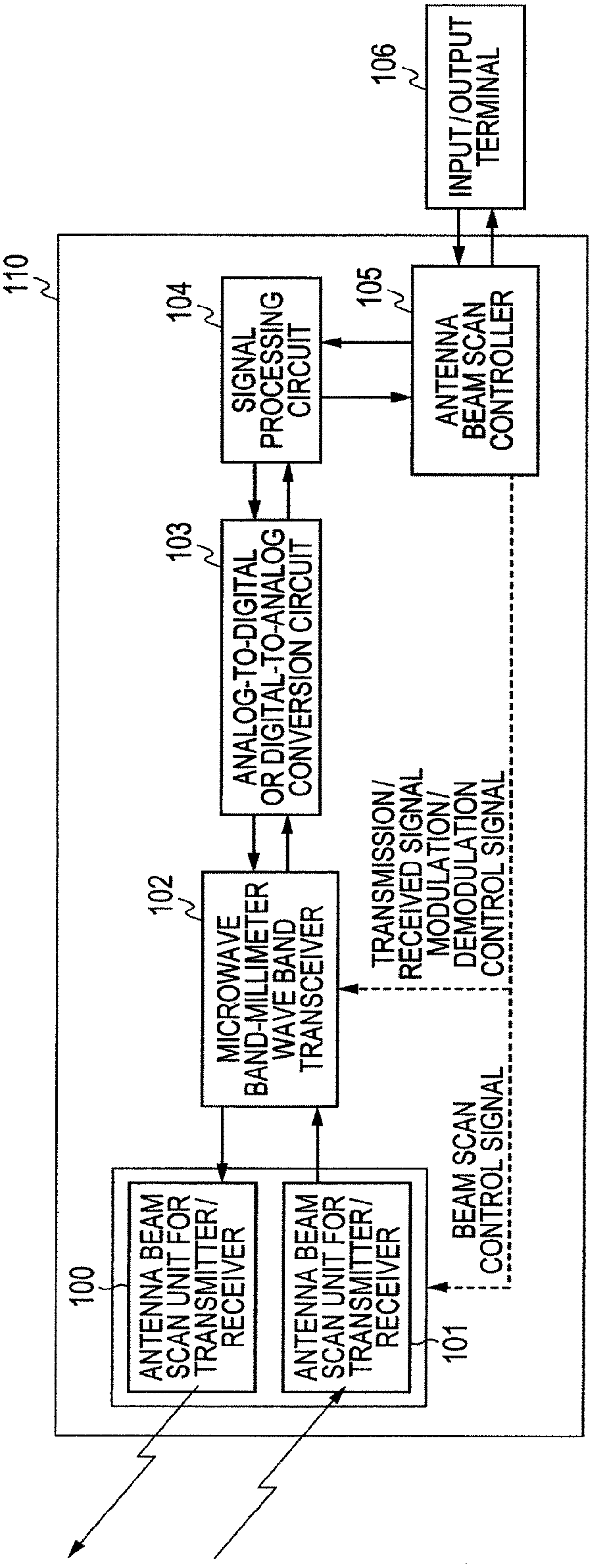
FIG. 3 is a diagram showing an example of a configuration of a wireless communication system of the present invention employing the antenna beam scan unit shown in FIG. 1.

FIG. 3 shows an example of a wireless communication system 110 in accordance with the first embodiment. There are shown an antenna beam scan unit for transmitter 100, an antenna beam scan unit for receiver 101, a microwave band-millimeter wave band transceiver 102, an analog-digital conversion circuit 103, and a signal processing circuit 104. An antenna beam scan controller 105 and an input/output terminal 106 are also shown.

In the wireless communication system 110, for establishment of wireless communication, the antenna beam scan controller 105 is used to cause the signal processing circuit 104 to produce transmission data according to a communication protocol. The microwave band-millimeter-wave band transceiver 102 performs modulation on the basis of the transmission data, and transmits a microwave or millimeter-wave signal, that is, a transmission signal Tx to the antenna beam scan unit for transmitter 100. In contrast, the beam control unit 7 of the antenna beam scan unit 100 or 101 selects beam ports BP of the Rotman lens and controls a null point (in-phase or reverse-phases synthetic wave) in response to a command based on a beam scan control signal sent from the antenna beam scan controller 105. For selection of beam ports, amplification by the variable amplifiers 3 in the scan unit, and switching of the states of the multi-port switches 8 are controlled. For control of the null point, switching of the states of the switches 5, that is, selection of paired phase shifters (one of the phase shifters is turned off and the other phase shifter is turned on) is controlled. During transmission, after the transmission data is transmitted, a signal coming from communication equipment of a target entity is caught. Therefore, a radio wave to be received by the antenna beam scan unit for receiver 101 is intercepted, and a received signal Rx is demodulated by the transceiver 102. Thereafter, the signal processing circuit 104 checks presence or absence of a communication signal, assesses a signal level, and inspects a probability marked on a data error bar, and transmits the results to the antenna beam scan controller 105. When no communication data is found, the beam control unit 7 updates the command based on the beam scan control signal sent from the antenna beam scan controller, and sequentially scans the ports of the Rotman lens 1 so as to search the communication signal.

Specifically, the beam control unit 7 sequentially selects two adjoining beam ports of the Rotman lens 1, and concurrently and independently controls adjustment of amplitude gains of the variable amplifiers 3, which are connected to the selected beam ports, and adjustment of phases by the switches 5. As for the other amplifiers, the beam control unit 7 brings them to a pinch-off state so as to attenuate signals. Thus, a beam of the phased-array antenna 2 that has undergone power division and synthesis via the Rotman lens 1 is formed with a synthetic wave of signals inputted through the adjoining beam ports. By sequentially selecting two adjoining beam ports and adjusting an amplitude ratio between two selected variable amplifiers 3, an antenna beam angle can be scanned in a non-stepped manner.

Figure 4:
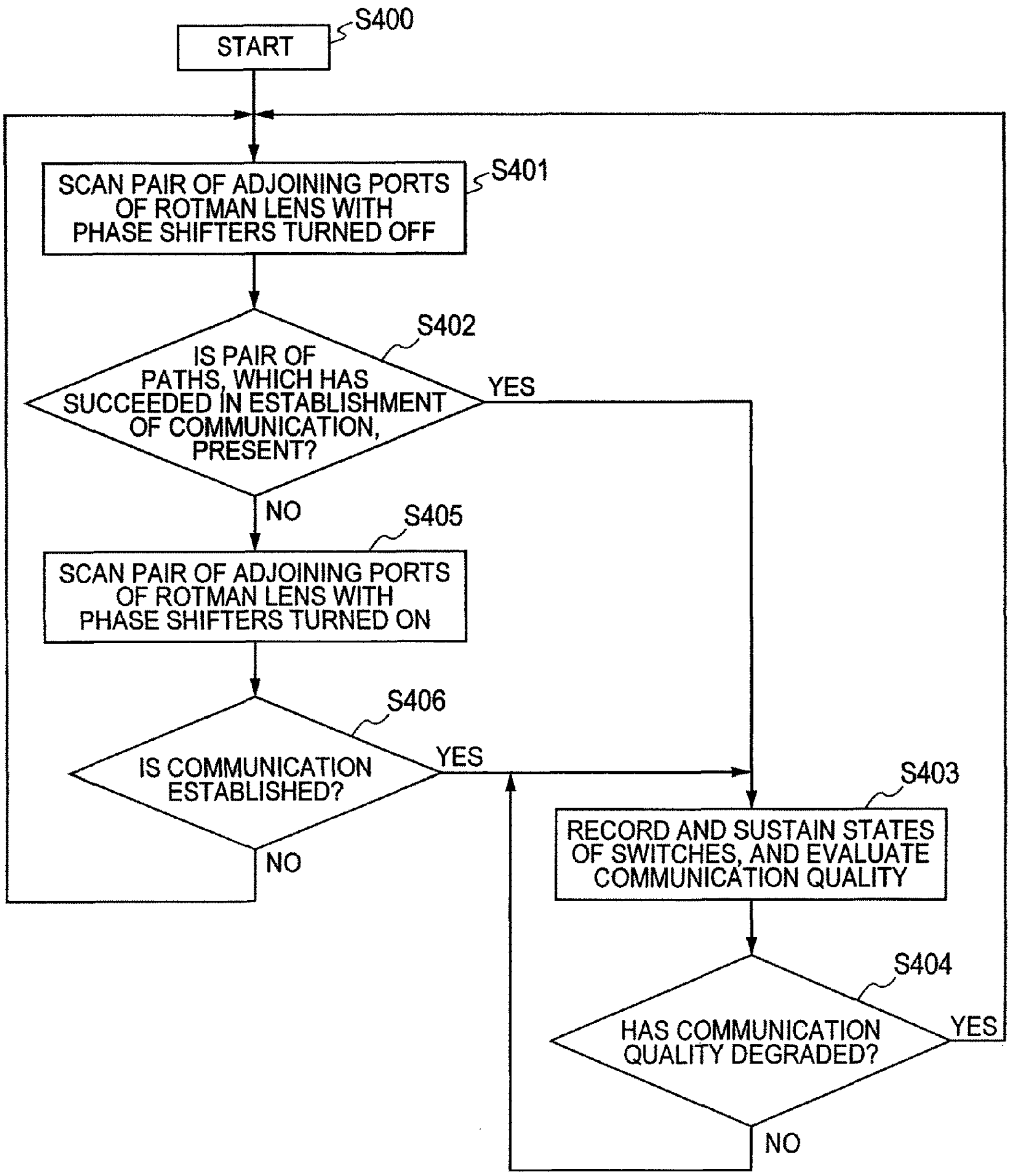
FIG. 4 is a flowchart for an antenna beam scan controller with which the antenna beam scan unit is operated in the wireless communication system shown in FIG. 3.

FIG. 4 is a flowchart involving the antenna beam scan controller 105, with which the antenna beam scan unit 100 or 101 is operated, and the beam control unit 7. Along with the initiation (S400) of antenna beam scan, the antenna beam scan controller 105 allows the beam control unit 7 to scan each of pairs of adjoining beam ports which produces an in-phase synthetic wave (with phase shifters turned off) that does not indicate a null point between the two adjoining beam ports (S401). The signal processing circuit 104 then decides based on whether a communication signal is present, whether a signal level required for demodulation is available, and a result of assessment of an error rate whether a communication can be satisfactorily established (S402). If the signal level high enough to establish a communication is attainable (Yes), a control signal of the antenna beam scan unit is stored, and inter-wireless communication systems communication is initiated. While the communication is established, the antenna beam scan controller 105 sequentially evaluates a result of assessment of communication quality (S403), and resumes scan according to whether the communication quality has degraded or communication data is found (S404). When the pair of beam ports has the phase shifters turned off, if degradation of an error rate alone is observed by performing parity check of a bit stream, occurrence of a communication failure due to multipath propagation is predicted. In this case, the antenna beam scan controller 105 is used to switch a current antenna beam pattern into an antenna beam pattern (obtained with one phase shifter turned off and the other phase shifter turned on) which indicates a null point between the two adjoin beam ports (S405). Scan based on beamforming is then initiated. If improvement of an error rate is estimated (Yes at S406), communication is initiated (established). If communication quality is still too low to establish communication (No at S406), the processing is returned to the initial step in order to search a new communication path, and resumed from the beginning of the flowchart. If an obstacle is not found in the vicinity of a target entity or is located far away, an in-phase synthetic wave (provided by a pair of adjoining beam ports with both phase shifters turned off) may be used to scan the Rotman lens. However, since a communication environment in which multipath propagation does not occur can hardly be obtained all the time, inclusion of a multipath propagation avoiding device dependent on null-point scan is indispensable for upgrading of communication quality.

Figure 5:
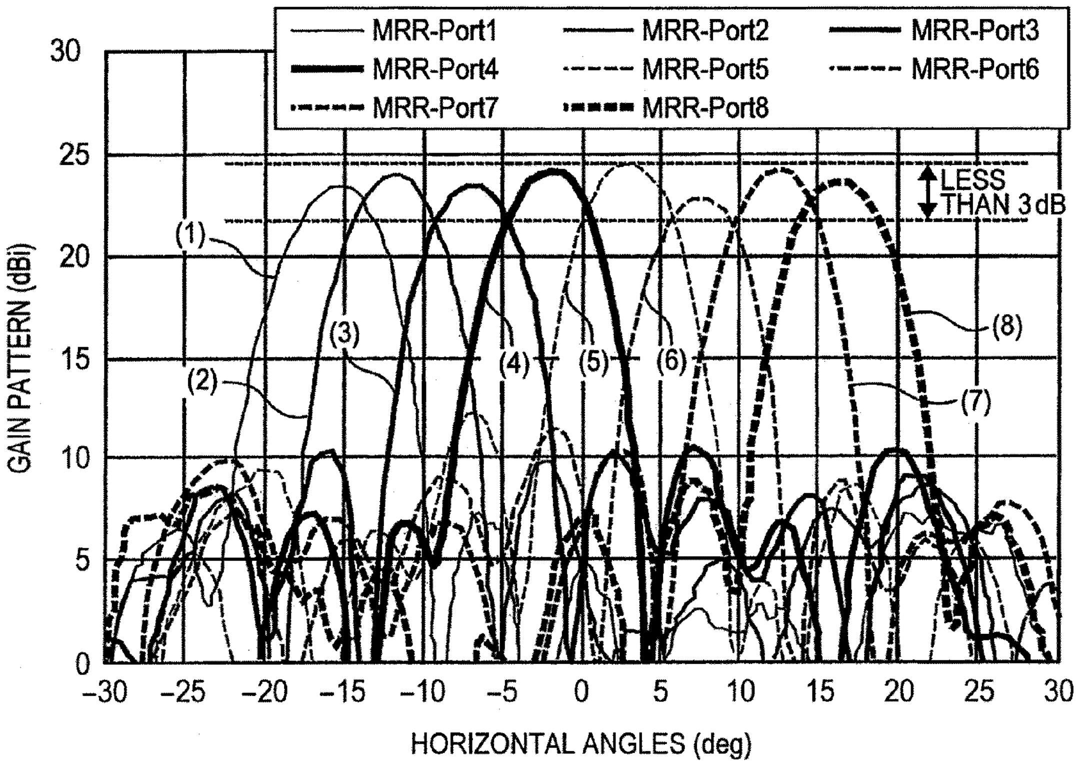
FIG. 5 is a diagram showing an example of radiation patterns in the antenna beam scan unit using the Rotman lens in FIG. 1.

FIG. 5 shows an example of antenna radiation patterns attained with twelve antenna ports and eight beam ports (BP1 to BP8) employed in the first embodiment. In the drawing, patterns (1) to (8) represent powers that are fed through the beam ports BP1 to BP8 (MRR-Port1 to MRR-Port8) while being in phase with one another (with all phase shifters turned off), divided and synthesized within the Rotman lens 1, and then radiated from the antenna elements 2. The antenna patterns represent an antenna characteristic of the Rotman lens which is designed so that the width W over which the antenna elements are juxtaposed is 10 cm and a beam graphically intersects an adjoining beam at a point of ±3° from a half-power point or about 3 dB below a peak value.

Figure 6:
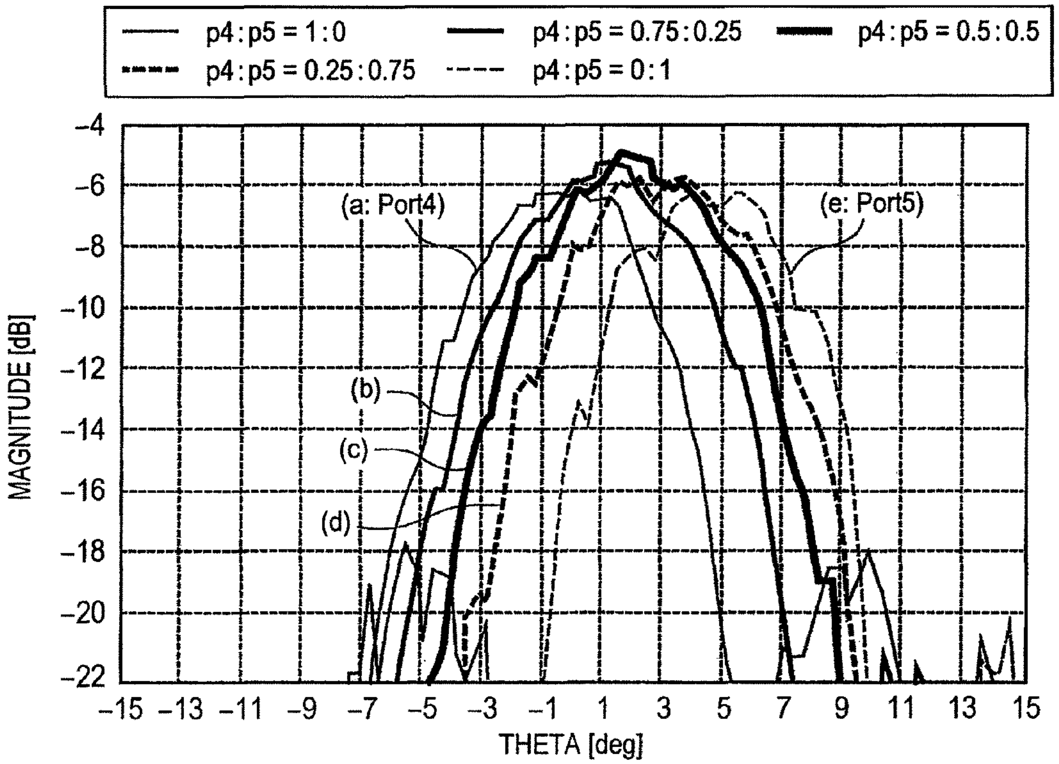
FIG. 6 is a diagram showing an example of radiation patterns to be attained when power is fed to plural ports of the Rotman lens in FIG. 1.

FIG. 6 shows an antenna characteristic attained with a synthetic wave produced with waves that are inputted through the physically adjoining beam ports BP4 and BP5 while being in phase with each other and having a power ratio thereof changed by the variable amplifiers 3. In FIG. 6, patterns (a) to (e) represent results obtained by feeding powers at five different power ratios of 1:3, ¾:¼, ½:½, ¼:¾, and 0:1. The peak of the synthetic wave is shifted leftward or rightward according to the power ratio controlled by the variable amplifiers 3, and the half-power width of the synthetic wave is nearly identical among the power ratios.

Figure 7:
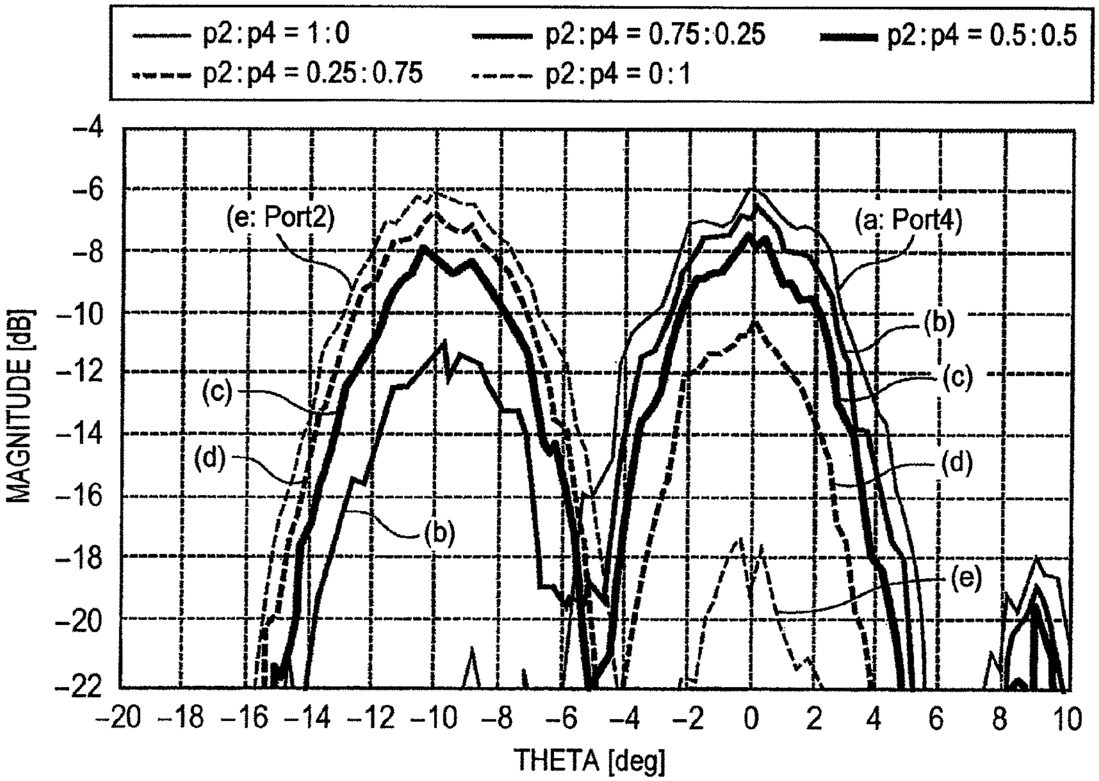
FIG. 7 is a diagram showing an example of radiation patterns that are attained when power is fed to input ports among the ports of the Rotman lens in FIG. 1, and that intersect outside their half-power points.

FIG. 7 shows an antenna characteristic that is attained with a synthetic wave produced with waves that are inputted through the beam ports BP2 and BP4, which do not adjoin, and that is represented with antenna patterns which intersect at a point 10 dB below the peak value. In the drawing, patterns (a) to (e) represent, similarly to those in FIG. 6, results of feeding powers, which are in phase with each another, at five different power ratios of 1:0, ¾:¼, ½:½, ¼:¾, and 0:1. When a point at which the patterns intersect is lower than the peak value by 6 dB or more, a degree of an adverse effect of a power difference on a main beam of each beam port is limited. This results in such an antenna characteristic that two peaks are observed and a half-power width of a beam of a phased-array antenna gets widened. In other words, when beam ports that do not adjoin are used, a synthetic wave of an excellent characteristic cannot be produced. In short, in order to ensure a communication environment in which multipath propagation does not occur, it is necessary to adopt adjoining beam ports of a Rotman lens.

Figure 8A:
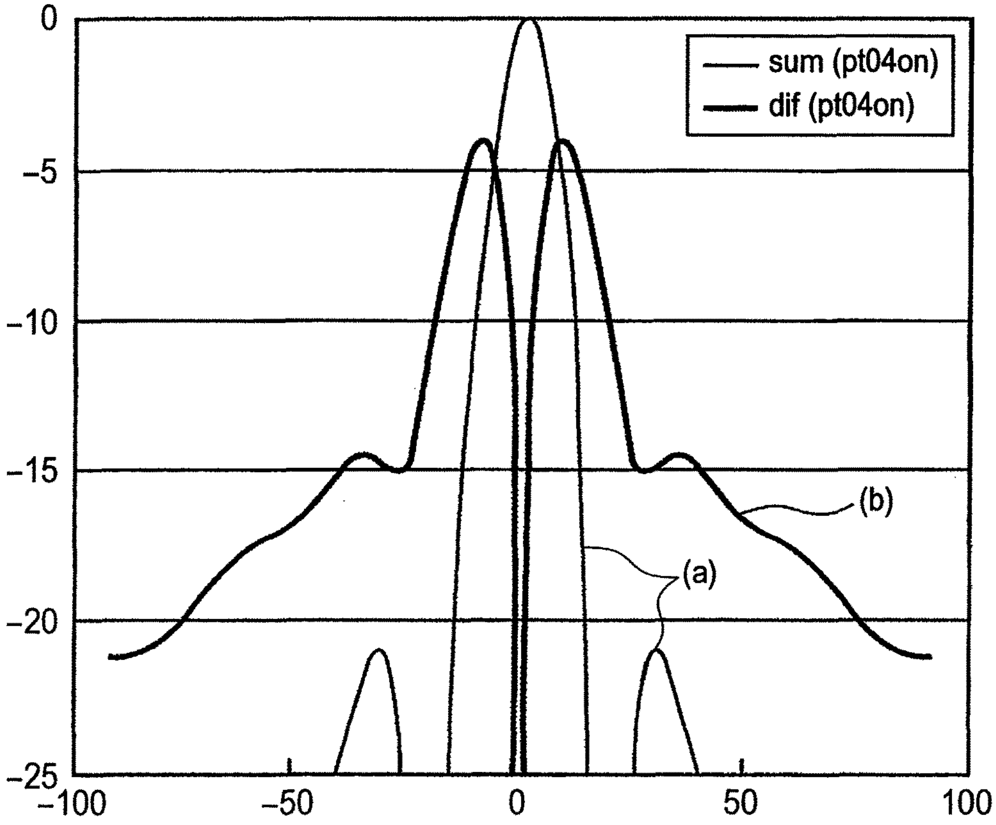
FIG. 8A is a diagram showing radiation patterns to be attained when power is fed to two adjoining input ports of the Rotman lens in such a manner that a phase is held intact and reversed.

FIG. 8A is a diagram showing radiation patterns attained when the configuration of the present invention is adopted, and power is fed to two adjoining beam ports, for example, the beam ports BP4 and BP5 shown in FIG. 6 over the first and second paths on which the phase is held intact or reversed. In the drawing, a pattern (a) represents an antenna characteristic attained when the phase shifters connected to the beam ports BP4 and BP5 are turned on. A pattern (b) represents an antenna characteristic attained when the phase shifter connected to the beam port BP4 is turned on and the phase shifter connected to the beam port BP5 is turned off. Namely, FIG. 8A shows the antenna patterns for (a) an in-phase synthetic wave (sum) and (b) a reverse-phases synthetic wave (difference) which are plotted based on calculated values and attained when power is fed to the adjoining beam ports.

As plotted as the pattern (b), the reverse-phases synthetic wave indicating a null point has two peaks separated from each other. Therefore, compared with the in-phase synthetic wave plotted as the pattern (a), a peak value of power is lower by a value equivalent to about 3 dB. However, when the wave indicates the null point, power equivalent to 10 dB or more can be suppressed. In addition, a half-power width relevant to one peak can be narrowed.

Figure 8B:
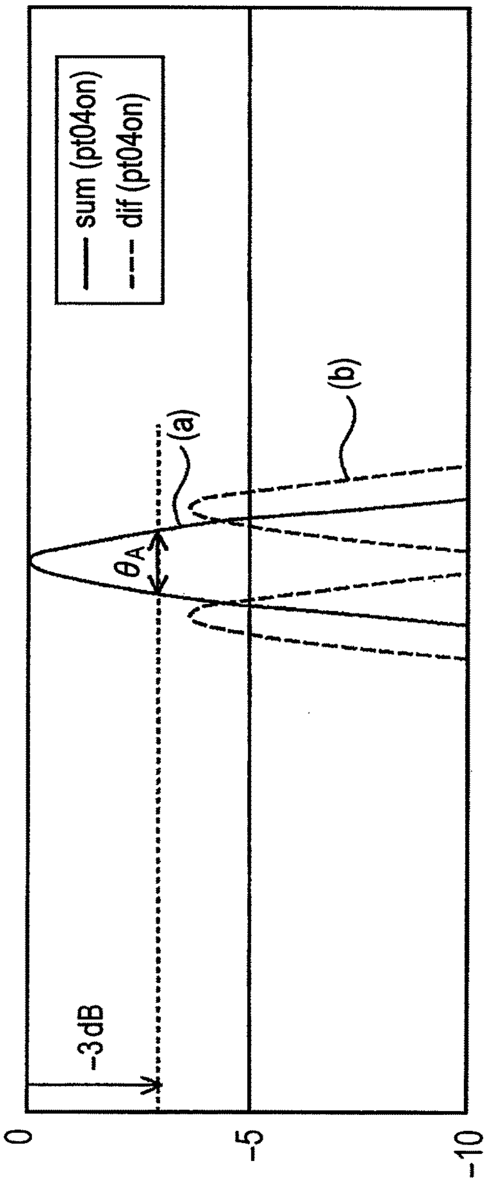
FIG. 8B is a diagram showing in enlargement the characteristic (a) of the pattern of a synthesized wave which is produced with the phase held intact as shown in FIG. 8A.
Figure 8C:
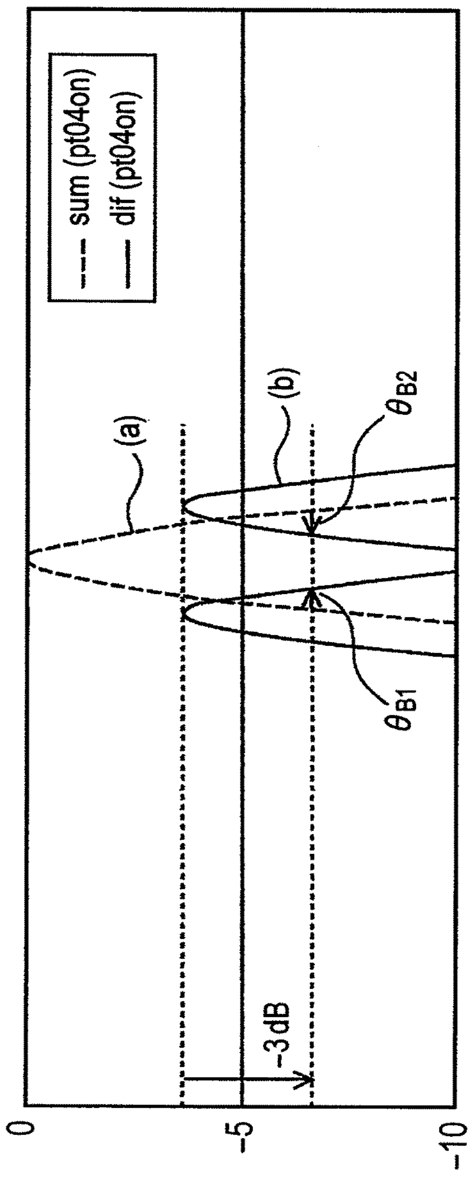
FIG. 8C is a diagram showing in enlargement the characteristic of the pattern of a synthesized wave which is produced with the phase reversed as shown in FIG. 8A.

FIG. 8B is a diagram showing in enlargement the characteristic represented by the pattern (a) for the in-phase synthetic wave shown in FIG. 8A. A half-power width of the in-phase synthetic wave is θA. FIG. 8C is a diagram showing in enlargement the characteristic represented by the pattern (b) for the reverse-phases synthetic wave shown in FIG. 8A. A half-power width relevant to each peak, especially an internal side (θb1 or θb2) of the half-power width, is narrowed. The half-power width (θb1+θb2) of the reverse-phases synthetic wave is smaller than the half-power width θA of the in-phase synthetic wave.

As mentioned above, when a beam port having a phase shifter turned off and an adjoining beam port having a phase shifter turned on are used, a reverse-phases synthetic wave indicating a null point and having a half-power width thereof narrowed can be obtained.

Similarly to FIG. 6, when the variable amplifiers 3 are used to adjust a ratio of powers that are inputted to two adjoining beam ports while having reverse phases, peaks of a reverse-phases synthetic wave can be shifted leftward or rightward according to the power ratio. Half-power widths are nearly equal to each other. Namely, when the variable amplifiers 3 are used to shift the peaks of the reverse-phases synthetic wave, non-stepped scan of a null point can be realized.

Therefore, even when an adverse effect of multipath propagation is outstanding because of a reflected wave that comes from an obstacle and that has the pattern thereof enclosed in the pattern of an in-phase synthetic wave, once antenna scan is performed by sweeping a beam that stems from a reverse-phases synthetic wave indicating a null point, the adverse effect of multipath propagation can be suppressed by directing the null point to the obstacle.

As mentioned above, according to the present embodiment, a pair of phase shifters connected to adjoining beam ports of a Rotman lens is employed, and one of the phase shifters is turned off and the other one is turned on. By inputting radio waves, the phases of which are reverse to each other, to the adjoining beam ports, an antenna beam can be formed to indicate a null point. Further, when variable amplifiers are used to adjust a ratio of powers to be inputted to two beam ports, non-stepped scan of the null point can be achieved. Accordingly, narrowing of the antenna beam and suppression of radio-wave power to be radiated in the direction of an obstacle can be accomplished without an increase in the numbers of antenna ports and beam ports of the Rotman lens. Namely, a millimeter-wave antenna beam scan unit capable of offering an antenna gain in a desired direction and narrowing an antenna beam without an increase in the number of input beams, and a wireless communication system using the antenna beam scan unit can be provided.

Second Embodiment

Figure 9:
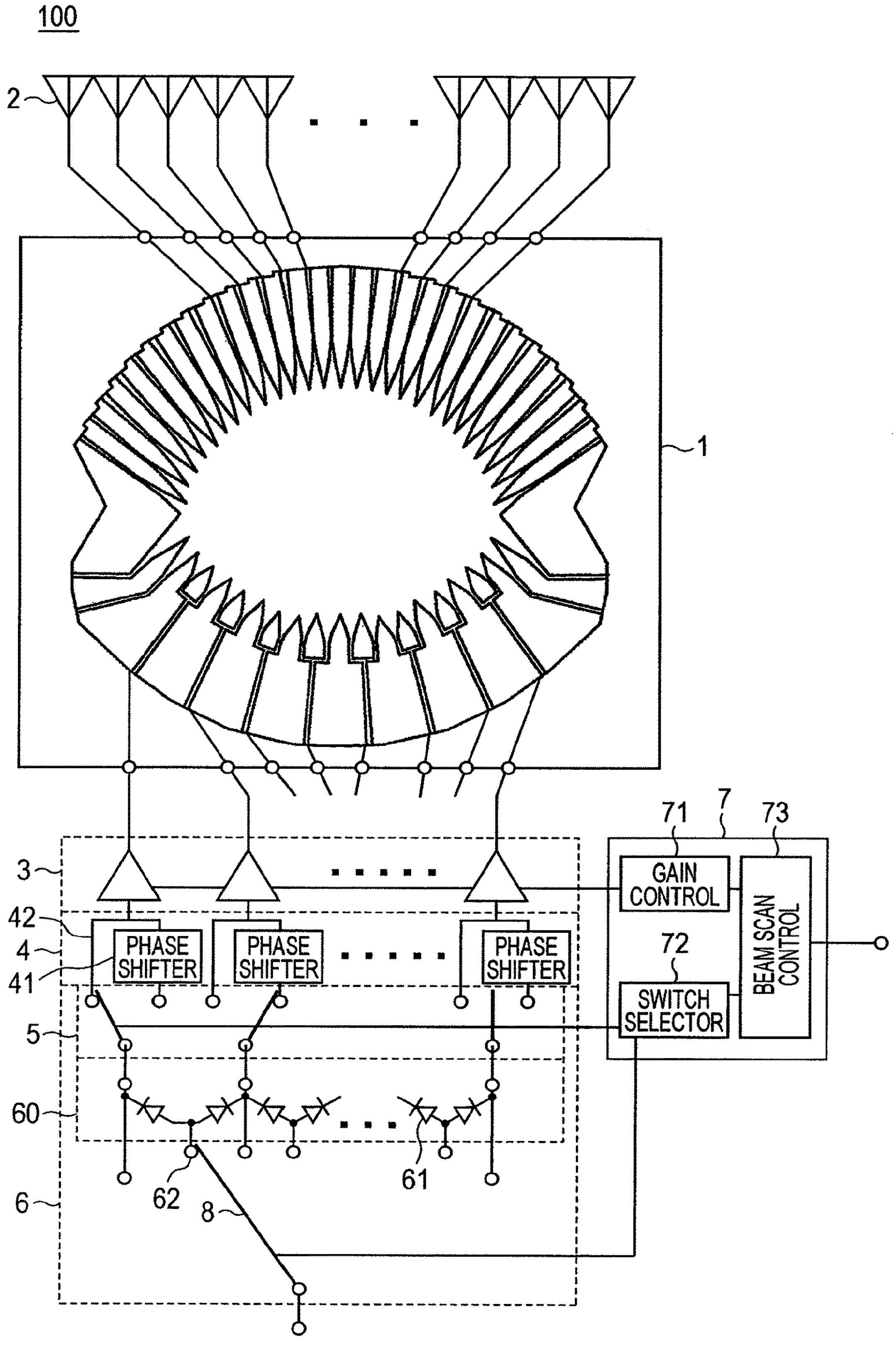
FIG. 9 is a configuration diagram showing power division in a multi-input Rotman lens for transmission in a second embodiment of the present invention.

FIG. 9 shows a second embodiment of an antenna beam scan unit of the present invention. There are shown a Rotman lens 1, antenna elements 2, variable amplifiers 3, fixed phase shifters 4, switches 5, a splitter 60, and a multi-port switch 8.

The Rotman lens shown in FIG. 9 is also an example including twelve antenna ports and eight beam ports. The antenna elements 2 are connected to the respective antenna ports of the Rotman lens 1, and the output terminals of the variable amplifiers 3 capable of performing amplitude modulation are connected to the respective beam ports. As input blocks 4 of the variable amplifiers 3, similarly to those in the first embodiment, the fixed phase shifters 41 that serve as second paths intended to indicate a null point when radio waves are radiated from the antenna elements 2 via the Rotman lens 1, and through paths 42 that are first paths intended to keep waves, which are inputted to adjoining beam ports, in phase with each other are connected. Two-output switches 5 for selecting whether or not to shift the phase of a signal to be inputted to the variable amplifier 3 have one output terminals thereof connected to the through paths, and have the other output terminals thereof connected to the paths formed with the fixed phase shifters. To the input terminal of the switch 5, two of output terminals of the splitter 60 disposed between adjoining input ports of the Rotman lens 1, and one of output terminal of the multi-port switch 8 are connected. The splitter 60 is a directional divider for feeding power to adjoining beam ports of the Rotman lens. In order to ensure isolation between the beam ports, diodes 61 that conduct electricity in one direction alone are used to construct the splitter, and the diodes feed power to the adjoining switches 5. The multi-port switch 8 has 2n−1 output terminals dependently of the number of beam ports n of the Rotman lens 1, and the output terminals are connected to n terminals, which are directly connected to the switches 5 in order not to divide power through the divider 60, and n−1 power division input terminals 62 of the splitter 60. When the multi-port switch 8 is connected to the terminal on a path coupled directly to the switch 5, the divider 60 does not divide power, but only one variable amplifier that is an output destination of the switch to which the multi-port switch 8 is connected can be allowed to work. A gain of the antenna beam scan unit can be improved by 3 dB equivalent to a division loss caused by the splitter. A power supply of the antenna beam scan unit can suppress power required for one variable amplifier.

In the first embodiment shown in FIG. 1, since the divider 6 divides power, signal intensity is decreased according to the number of portions into which the power is divided. By utilizing the multi-port switch of the present embodiment, the decrease in the signal intensity can be limited to a loss equivalent to an on resistance of the switch.

Third Embodiment

Figure 10:
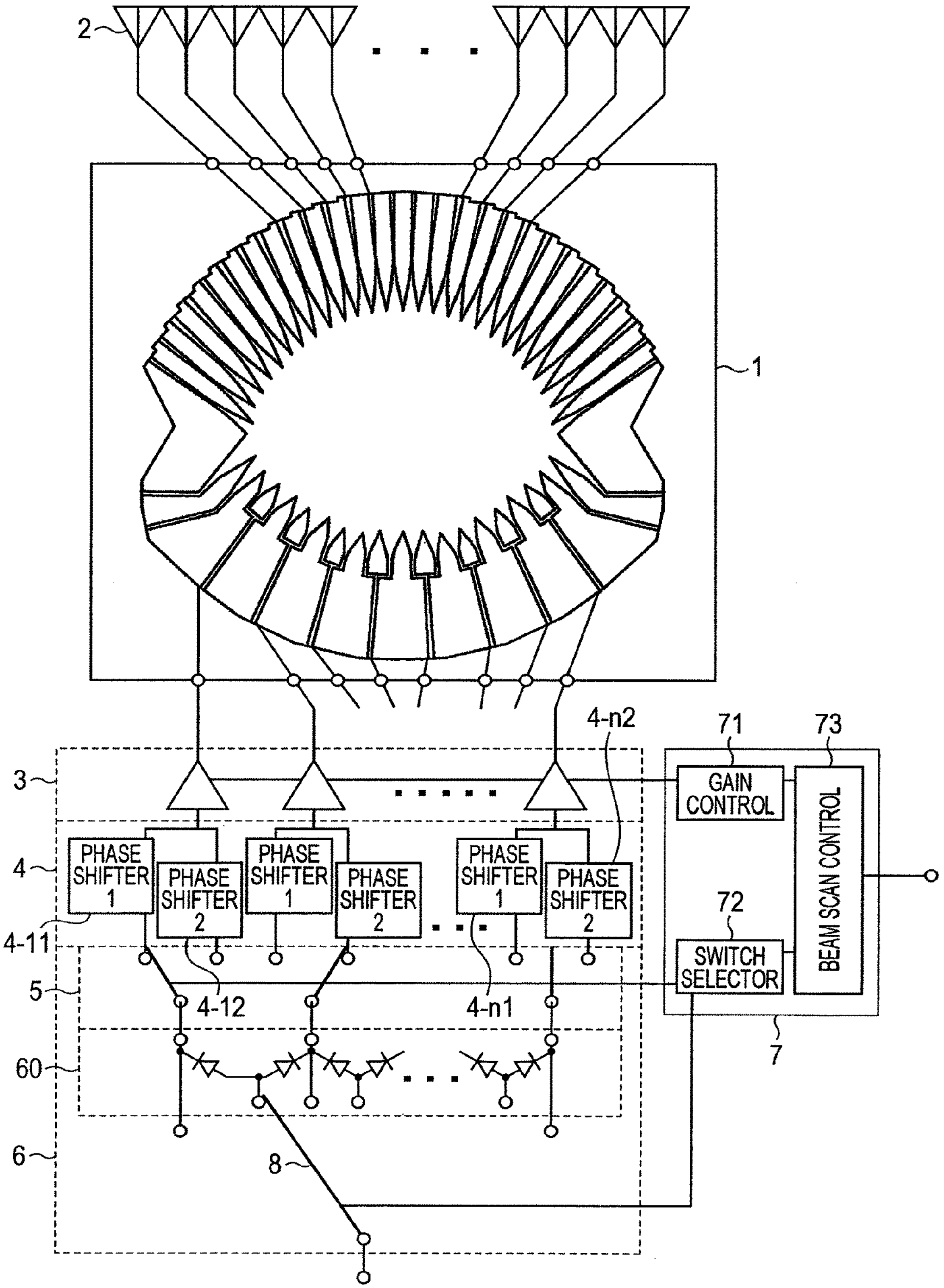
FIG. 10 is a configuration diagram showing power division in a multi-input Rotman lens for transmission in a third embodiment of the present invention.

FIG. 10 shows a third embodiment of an antenna beam scan unit of the present invention. There are shown a Rotman lens 1, antenna elements 2, variable amplifiers 3, a group of fixed phase shifters 4, switches 5, a splitter 60, and a multi-port switch 8.

The Rotman lens 1 shown in FIG. 10 is an example having twelve antenna ports and eight beam ports. The antenna elements 2 are connected to the respective antenna ports of the Rotman lens, and the output terminals of the variable amplifiers 3 capable of performing amplitude modulation are connected to the respective beam ports. As an input block of each of the variable amplifiers 3, the fixed phase shifters are connected to two input terminals thereof. The group of fixed phase shifters 4 has difficulty in forming a transmission path on which no phase difference is given in a millimeter-wave band. As first paths on which no phase difference is given and second paths on which a signal that is out of phase with a signal on the first path is produced, a first group of phase shifters (4-11 to **4-*n*1) and a second group of phase shifters (4-12 to 4-*n*2) which are designed so that phases determined by two fixed phase shifters are reverse to each other are employed. The input terminals of the group of fixed phase shifters are connected to the output terminals of the two-output switches 5 for selecting a magnitude of a phase shift that is incurred by a signal to be inputted to the variable amplifier. Two of output terminals of the splitter 60, which are disposed between adjoining input ports of the Rotman lens, and one of output terminal of the multi-port switch 8 are connected to each of the input terminals of the switches 5. The splitter 60 is a directional divider intended to feed power to adjoining beam ports of the Rotman lens, and is formed using diodes 61, which conduct electricity in one direction alone, in order to ensure isolation between the beam ports. The splitter 60 feeds power to the adjoining switches 5. The multi-port switch 8 has 2n−1 output terminals dependently of the number of beam ports n of the Rotman lens, and the output terminals are connected to n terminals, which are directly connected to the switches 5 in order not to divide power through the splitter 60, and to n−1 input terminals of the splitter 60** that divides power.

In the embodiment shown in FIG. 10, a reverse-phases signal is produced by applying signals over a pair of first and second paths out of those realized with the two groups of phase shifters, so that a null point can be manifested at an intermediate position as long as a power ratio remains unchanged. However, a phase different need not be fixed to 180°. Since the null point is manifested when the signals have the same amplitude and reverse phases, an angle dependency of a peak value of a beam may not be stable. That is, even when the phase difference is fixed to an angle other than 180°, null-point scan can be achieved by adjusting the power ratio determined by the variable amplifiers.

Fourth Embodiment

Next, referring to FIG. 11 and FIG. 12, an example of a configuration of a wireless communication system employing an antenna beam scan unit in accordance with any of the aforesaid embodiments will be described as a fourth embodiment of the present invention.

A wireless communication system 110 includes an antenna beam scan unit for transmitter 100, an antenna beam scan unit for receiver 101, a microwave band-millimeter wave band transceiver 102, an analog-digital converter 103, a signal processing circuit 104, an antenna beam scan controller 105, an input/output terminal 106, and a microwave band antenna 107. The antenna beam scan controller 105 produces a beam scan control signal (Cont) and controls a beam control unit 7 (See FIG. 1). Specifically, the antenna beam scan controller 105 uses a beam scan control 73 of the beam control unit 7 to control a gain control 71 and a switch control 72. Thus, the antenna beam scan controller controls a null point and a gain provided by the variable amplifier 3.

A millimeter wave signal exhibits a strong tendency to rectilinear propagation and suffers terrible propagation decay. Therefore, when an attempt is made to establish an unknown communication link by performing scan with a high-gain narrow-angle antenna beam, there is a fear that a communication signal may be lost because the scan is time-consuming.

Figure 11:
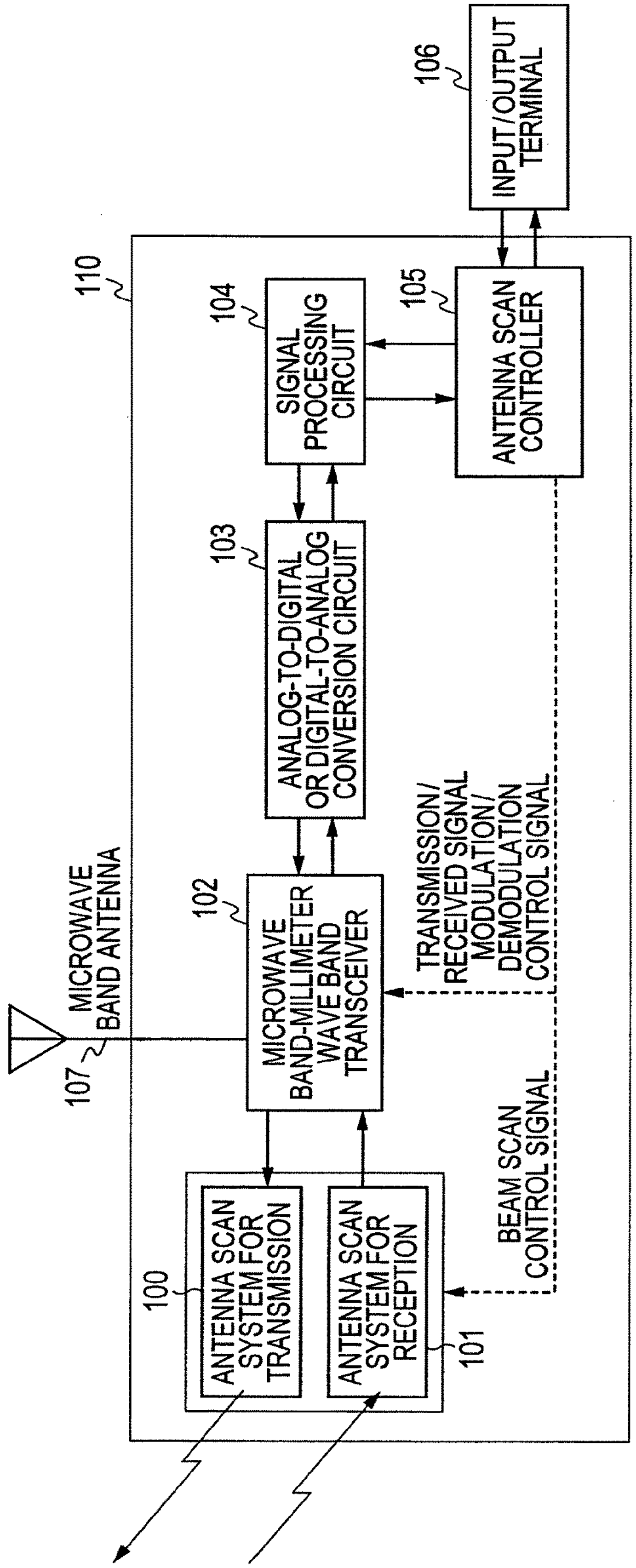
FIG. 11 is a diagram showing another example of the configuration of a wireless communication system of the present invention employing an antenna beam scan unit in accordance with any of the embodiments of the present invention.

As shown in FIG. 11, in addition to the millimeter wave band antenna beam scan units 100 and 101, the microwave band transmitting/receiving antenna 107 is included in the microwave band-millimeter wave band transceiver 102. The microwave band-millimeter wave band transceiver 102 includes a wireless communication feature conformable to Bluetooth or ZigBee based on the IEEE 802.15 standards, serves as an auxiliary communication device for establishing a millimeter wave band communication, and supports establishment of communication between wireless communication systems.

Figure 12:
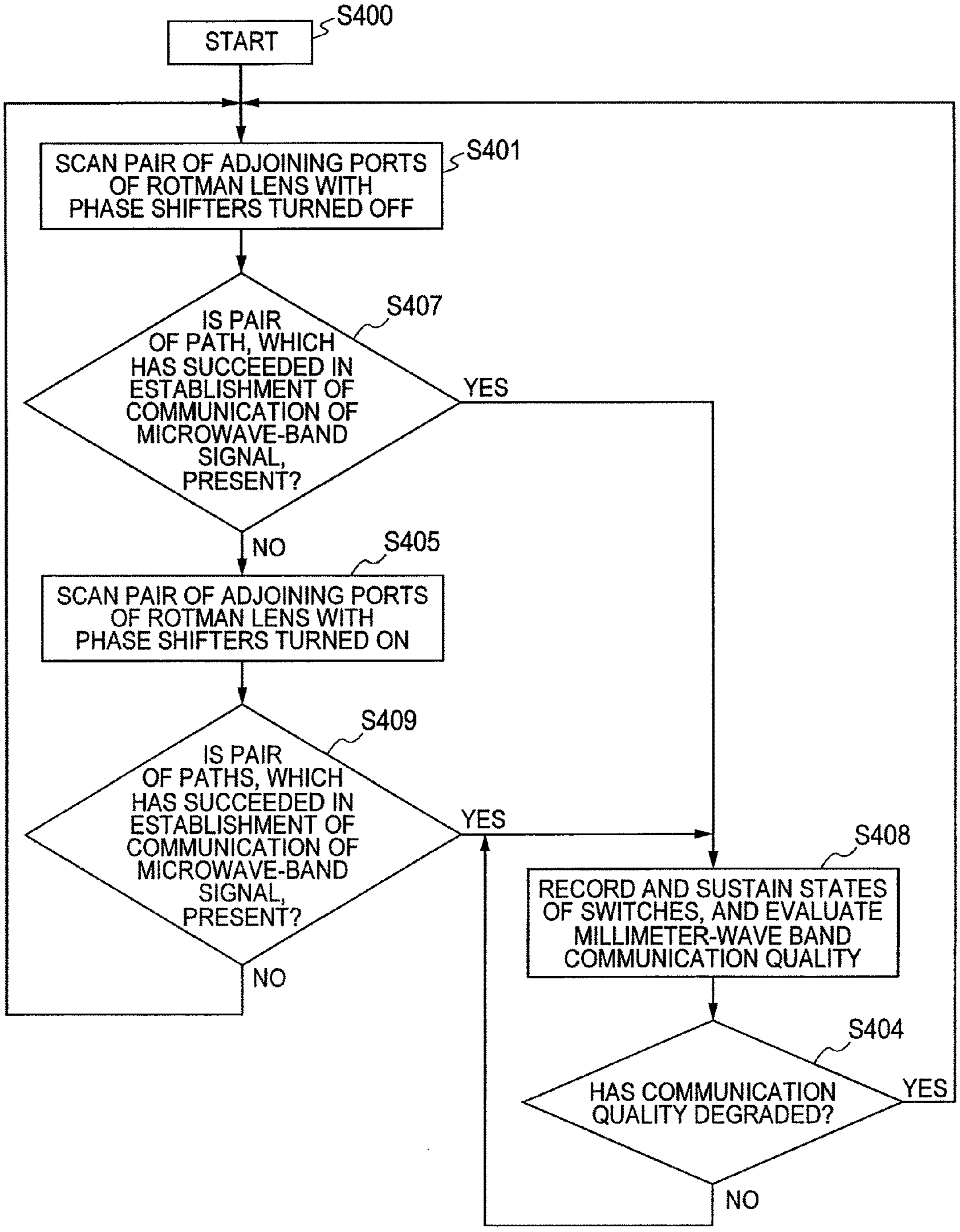
FIG. 12 is a flowchart for an antenna beam scan controller with which the antenna beam scan unit in FIG. 11 is operated.

FIG. 12 is a flowchart for an antenna beam scan controller with which the antenna beam scan unit shown in FIG. 11 is operated. Along with initiation of antenna scan (S400), the antenna beam scan controller 105 allows the beam control unit 7 to scan each pair of beam ports with an in-phase synthetic wave, which does not indicate a null point between two adjoining beam ports, produced (with both the phase shifters turned off) (S401). Using a signal of the microwave band transmitting/receiving antenna, the signal processing circuit 104 decides on the basis of whether a communication signal is found, whether a signal level required for demodulation is observed, or a result of assessment of an error rate whether communication can be established (S407). If the signal level is high enough to establish communication (Yes), a control signal of the millimeter wave band antenna beam scan unit is stored, and inter-wireless communication systems communication is initiated. While the communication is established, the antenna beam scan controller 105 sequentially evaluates the result of assessment of millimeter wave band communication (S408), and resumes scan according to whether the communication quality has degraded or whether communication data is found (S404). When the phase shifters connected to a pair of beam ports are turned off, if degradation of an error rate alone is observed through parity check of a bit stream, occurrence of a communication failure due to multipath propagation is predicted. In this case, the antenna beam scan controller 105 switches an antenna beam pattern to a pattern that indicates a null point between two adjoining beam ports (with one of phase shifters turned off and the other one turned on) (S405), and initiates scan based on beamforming. If upgrading of the error rate is estimated (Yes at S409), communication is initiated (established). If communication quality is too low to establish millimeter-wave band communication, a new communication path is searched. Therefore, processing is resumed from the beginning of the flowchart. If an obstacle is absent from the vicinity of a target entity or is located far away, an in-phase synthetic wave may be used to scan the Rotman lens (with both phase shifters turned off). There is difficulty in ensuring a communication environment in which multipath propagation does not occur. Therefore, employment of a multipath propagation avoiding device dependent on null point scan is indispensable for improvement of communication quality.

According to the present embodiment, a loss of a communication signal can be minimized. Further, if unnecessary scan with a millimeter-wave signal can be avoided, a millimeter-wave band transceiver whose power efficiency is poor can be stopped but need not be operated all the time. This leads to power saving.

What is claimed is:

1. An antenna beam scan unit comprising:

a Rotman lens that performs power division and synthesis between a plurality of antenna ports and three or more beam ports;

a plurality of antenna elements which are connected to the respective antenna ports of the Rotman lens and to or from which radio waves are inputted or outputted;

a plurality of amplifiers the number of which is identical to the number of the beam ports, which are connected to the respective beam ports of the Rotman lens, and which perform amplitude modulation on a signal;

a plurality of input paths for a transmission signal disposed in association with the plurality of amplifiers;

a plurality of switches for switching the input paths; and a beam control unit that controls the amplifiers and the switches, wherein each of the input paths include a first path and a second path on which a signal that is out of phase with a signal on the first path is produced; and wherein the beam control unit selects two adjoining beam ports, and switches the first paths and second paths as the input paths for the two adjoining beam ports.

2. The antenna beam scan unit according to claim 1, wherein the beam control unit selects a pair of physically adjoining input paths of the Rotman lens on the basis of an externally fed beam scan control signal, thus forms power feed paths on which a phase is held intact or reversed, whereby controls the input paths so that a beam of the antenna element which has undergone power division and synthesis via the Rotman lens indicates a null point.

3. The antenna beam scan unit according to claim 2, wherein the beam control unit sequentially selects two adjoining beam ports from among the plurality of beam ports of the Rotman lens, concurrently and independently controls adjustment of amplitude gains of the amplifiers connected to the selected beam ports and adjustment of phases through the switches, and brings the other amplifiers to a pinch-off state so as to attenuate signals.

4. The antenna beam scan unit according to claim 3, wherein the beam control unit sequentially selects two adjoining beam ports, and scans an antenna beam angle in a non-stepped manner by adjusting an amplitude ratio between the two selected amplifiers.

5. The antenna beam scan unit according to claim 1, wherein the input paths include the first path and the second path including a fixed phase shifter that produces a signal which is out of phase with a signal on the first path.

6. The antenna beam scan unit according to claim 1, wherein each input path for the transmission signal is coupled to a divider that performs power division and that is arranged for inputting the transmission signal.

7. The antenna beam scan unit according to claim 6, wherein the divider is a splitter having two output terminals that are associated with adjoining input ports of the Rotman lens, and are connected to the switches; and wherein the antenna beam scan unit further comprises a multi-port switch that is directly connected to the switches for switching the input paths without intervention of the divider.

8. The antenna beam scan unit according to claim 7, wherein the splitter is a directional divider for feeding power to adjoining beam ports of the Rotman lens, and includes diodes that conduct in one direction alone so as to ensure isolation between the beam ports.

9. The antenna beam scan unit according to claim 1, wherein the first paths and second paths of the input paths are realized with first phase shifters and second phase shifters which are designed so that phases determined by two fixed phase shifters are reverse to each other.

10. A wireless communication system comprising:

an antenna beam scan unit for transmitter;

an antenna beam scan unit for receiver;

a microwave band-millimeter wave band transceiver that modulates or demodulates a radiofrequency signal inputted or outputted to or from either of the antenna beam scan units;

an analog-digital conversion circuit that converts an analog signal into a digital signal or vice versa when receiving or handing a signal from or to the microwave band-millimeter wave band transceiver;

a signal processing circuit that performs signal processing on the digital signal;

an antenna beam scan controller that controls the antenna beam scan units; and an input/output terminal via which the wireless communication system is connected to external digital equipment, wherein the antenna beam scan controller sequentially selects two adjoining beam ports from among a group of three or more beam ports of a Rotman lens, concurrently and independently controls adjustment of amplitude gains of amplifiers connected to the selected beam ports and adjustment of phases through switches, and brings the other amplifiers to a pinch-off state so as to attenuate signals;

wherein a beam of an antenna that has undergone power division and synthesis via the Rotman lens is formed with a synthetic wave of signals inputted through the adjoining beam ports; and wherein the antenna beam scan controller sequentially selects the two adjoining beam ports, and adjusts an amplitude ratio between the two selected amplifiers.

11. The wireless communication system according to claim 10, wherein the antenna beam scan unit for transmitter comprises a Rotman lens that performs power division and synthesis between a plurality of antenna ports and three or more beam ports, a plurality of antenna elements which are connected to the respective antenna ports of the Rotman lens and to or from which radio waves are inputted or outputted, a plurality of amplifiers the number of which is identical to the number of beam ports, which are connected to the respective beam ports of the Roman lens, and which perform amplitude modulation on a signal, a plurality of input paths for a transmission signal disposed in association with the respective amplifiers, a plurality of switches for switching the input paths, and a beam control unit that controls the amplifiers and switches;

wherein each of the input paths include first path and second path on which a signal that is out of phase with a signal on the first path is produced; and wherein the antenna beam scan controller controls the beam control unit according to a beam scan control signal, selects a pair of physically adjoining input paths of the Rotman lens so as to form a power feed path on which a phase is held intact or reversed, and indicates a null point in a beam of the antenna element that has undergone power division and synthesis via the Rotman lens.

12. The wireless communication system according to claim 10, wherein a divider is included for dividing power into the same number of portions as the number of beam ports of the Rotman lens;

wherein the terminals of the divider include a series-connection terminal through which power is directly fed when the divider is connected to the switch that switches the two paths which give a phase difference, and a splitter terminal including a splitter that bisects power to feed the resultant portions to adjoining switches; and wherein, when the number of beam ports of the Rotman lens is N, the number of series-connection terminals is N, the splitter terminal has N−1 input terminals, and a multiple-output switch has 2N−1 output terminals.

13. The wireless communication system according to claim 12, wherein the switch connected onto two paths which give a phase difference has fixed phase shifters connected onto the two paths, and the switch produces a desired phase difference for millimeter wave band paths.

14. The wireless communication system according to claim 10, wherein the antenna beam scan controller allows the antenna beam scan unit for transmitter or receiver to control a beam scan and the phase of a synthetic wave;

wherein the microwave band-millimeter wave band transceiver selects a modulation/demodulation method and controls a received signal level;

wherein the signal processing circuit controls presence or absence of a communication signal, digitization of a signal level, error correction of a communication signal bit stream, and calculation of a bit error rate; and wherein, based on a result of assessment of communication quality provided by the signal processing circuit, the antenna beam scan unit produces a beam scan control signal, selects a pair of physically adjoining input paths of the Rotman lens so as to form power feed paths on which a phase is held intact or reversed, and indicates a null point in a beam of the antenna element that has undergone power division and synthesis via the Rotman lens.

15. The wireless communication system according to claim 10, wherein the antenna beam scan controller concurrently and independently controls adjustment of amplitude gains of the amplifiers connected to beam ports selected from among a group of three or more beam ports of the Rotman lens, and adjustment of phases through the switches, and brings the other amplifiers to a pinch-off state so as to attenuate signals;

wherein, a beam of the antenna that has undergone power division and synthesis via the Rotman lens is formed with a synthetic wave of signals inputted through the adjoining beam ports;

wherein the antenna beam scan controller sequentially selects two adjoining beam ports and scans the antenna beam angle in a non-stepped manner by adjusting an amplitude ratio between the two selected amplifiers.

* * * * *